United States Patent [19]

Igura

[11] Patent Number: 4,574,334
[45] Date of Patent: Mar. 4, 1986

[54] DEVICE FOR ADJUSTING THE INCLINATION OF THE LIGHT AXIS OF HEADLAMPS OF A MOTOR VEHICLE

[75] Inventor: Kenkichi Igura, Fujisawa, Japan
[73] Assignee: Ichikoh Industries, Ltd., Tokyo, Japan
[21] Appl. No.: 591,830
[22] Filed: Mar. 21, 1984

[30] Foreign Application Priority Data

Mar. 22, 1983 [JP] Japan .............................. 58-39685[U]
Mar. 22, 1983 [JP] Japan .............................. 58-39686[U]
Aug. 16, 1983 [JP] Japan ............................ 58-126162[U]

[51] Int. Cl.⁴ .............................................. F21V 3/18
[52] U.S. Cl. ..................................... 362/66; 362/270; 362/273; 362/371; 362/430
[58] Field of Search .................... 362/66, 69, 270, 273, 362/371, 428, 430

[56] References Cited

U.S. PATENT DOCUMENTS 4,237,529 12/1980 Mutschler et al. ..................... 362/66
4,271,456 6/1981 Dick ...................................... 362/66
4,306,276 12/1981 Dick ...................................... 362/66
4,309,740 1/1982 Takata ................................... 362/66

FOREIGN PATENT DOCUMENTS 2089958 6/1982 United Kingdom .

Primary Examiner—Ira S. Lazarus
Attorney, Agent, or Firm—Schwartz, Jeffery, Schwaab, Mack, Blumenthal & Evans

[57] ABSTRACT

A light axis adjusting device for use to the headlamps of motor vehicles comprising casings, a motor arranged in the casings, a speed reduction mechanism arranged in the casings and functionally connected to the motor and a hollow gear, respectively, to reduce the output of the motor and transmit it to the hollow gear, a sleeve inserted into the hollow gear and moved linearly when the hollow gear is rotated, a converting mechanism for converting the rotation of the hollow gear to a force which causes the sleeve to be moved linearly, and a driver shaft passed through the sleeve to control and adjust the light axis of the headlamp, following the movement of the sleeve.

6 Claims, 18 Drawing Figures

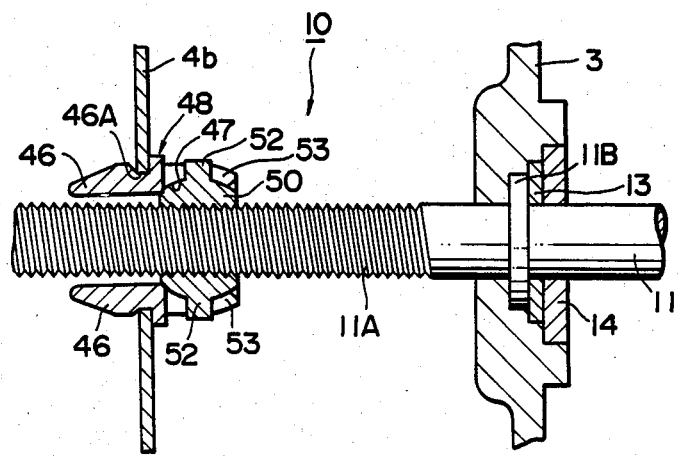
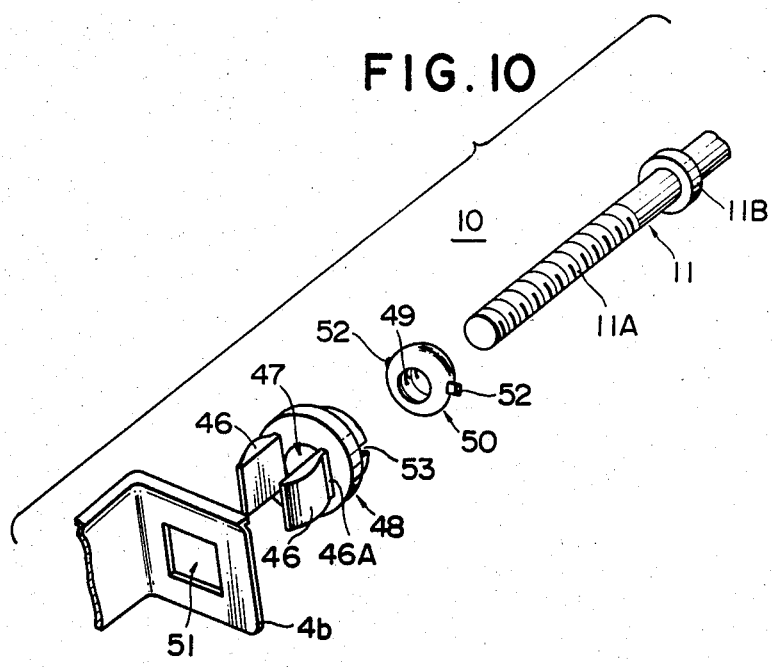

DEVICE FOR ADJUSTING THE INCLINATION OF THE LIGHT AXIS OF HEADLAMPS OF A MOTOR VEHICLE

BACKGROUND OF THE INVENTION

1. Field of the Invention

The present invention relates to a device for adjusting the inclination of the light axis of headlamps of a motor vehicle.

2. Description of the Prior Art

The headlamps of a motor vehicle or car, for example, are needed to light ahead the car in such a way that the driver can drive the car without hindrance and that those who drive cars coming up cannot be dazzled by the light. The headlamps attached to the car in the course of car assembly are therefore aiming-adjusted to exactly direct their light axis so as to achieve easy driving but not to dazzle the drivers who operate cars coming up. The light axis of the headlamps change, however, depending upon the carrying conditions such as number of persons boarded and weight of cargo loaded. Namely, they are shifted upward when a heavy cargo is loaded on the back of the car but downward when it is loaded on the front of the car. It often happens, therefore, that driving of the car is made troublesome and that those who drive cars coming up are dazzled. Accordingly, the conventional headlamp for motor vehicles is provided with the device for levelling the headlamp so as to adjust (or correct) the inclination of the light axis of said headlamp to return to its aimed position, counterbalancing various changes of car condition.

In the case of the conventional device for adjusting the inclination of the light axis, however, the headlamp levelling means is independent of the aiming means. Upon attaching these means to the headlamp, therefore, the aiming means must be connected to the device for adjusting the inclination of the light axis of headlamp means of a different connector, thereby increasing the number of parts used and making their attachment to the headlamp complicated and the space which they occupy large.

The conventional devices for adjusting the inclination of the light axis of headlamp are grouped in construction to the type wherein the light axis is changed according to the amount of linear movement of a shaft driven by a motor and wherein the angle of the headlamp is detected by the operation of a switch which serves to detect the moved position of the shaft; and to the other type wherein both of a motor and a wire are used in such a way that the crank-connected wire is tensioned by the motor to change the angle of the headlamp in upward and downward directions. With these light axis adjusting devices in which the amount of linear movement of the shaft itself determines the range of inclination angle of the light axis, the amount of movement of the shaft is asked to be extremely small because the device must be small-sized, so high accuracy angle adjustment cannot be attained. In addition, the extent to which the device of this type can be small-sized is limeted. When it is sized as small as possible, the angle of the light axis and the light-axis-adjusted position cannot be detected with high accuracy. Further, a large operational loss is caused in the driver circuit for adjusting the inclination of the light axis.

SUMMARY OF THE INVENTION

The present invention is therefore intended to eliminate the above-mentioned drawbacks.

An object of the present invention is to provide a device for adjusting the inclination of the light axis of a headlamp for motor vehicles, and which device is compact and can be formed as a unit and easily attached to the headlamp or car.

Another object of the present invention is to provide a device for adjusting the inclination of the light axis of a headlamp for motor vehicles, and which device is compact, small in the number of parts used, and enables the headlamp to be easily attached to the car body, occupying the smallest space.

A further object of the present invention is to provide a device for adjusting the inclination of the light axis of a headlamp for motor vehicles, and which device is provided with aiming and levelling mechanisms of headlamps.

A still further object of the present invention it to provide a device for adjusting the inclination of the light axis of a headlamp for motor vehicles, and which device is compact and enables the amount of movement of a shaft for changing the inclination angle of the headlamp to be achieved with high accuracy.

A still further object of the present invention is to provide a device for adjusting the inclination of the light axis of a headlamp for motor vehicles wherein the amount of movement of a drive shaft member for adjusting the inclination angle of the headlamp is detected by a continuous variable resistor to adjust the inclination of the light axis with high accuracy, and which device can be small-sized as a whole.

These and other objects as well as merits of the present invention will become apparent from the following detailed description with reference to the accompanying drawings.

BRIEF DESCRIPTION OF THE DRAWINGS

FIG. 9 is a sectional view showing the main portion in FIG. 6 enlarged.

FIG. 10 is a perspective view showing the main portion in FIG. 9 dismantled.

DESCRIPTION OF THE PREFERRED EMBODIMENTS

Figure 1:
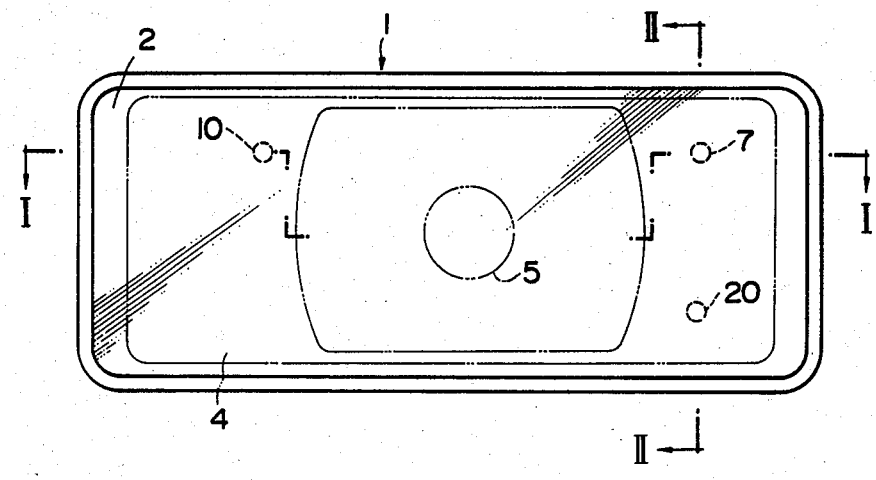
FIG. 1 is a front view showing a headlamp to which an example of a device for adjusting the inclination of the light axis of headlamps according to the present invention is attached.

Some examples of light axis adjusting device according to the present invention will be described in detail referring to the drawings.

Figure 2:
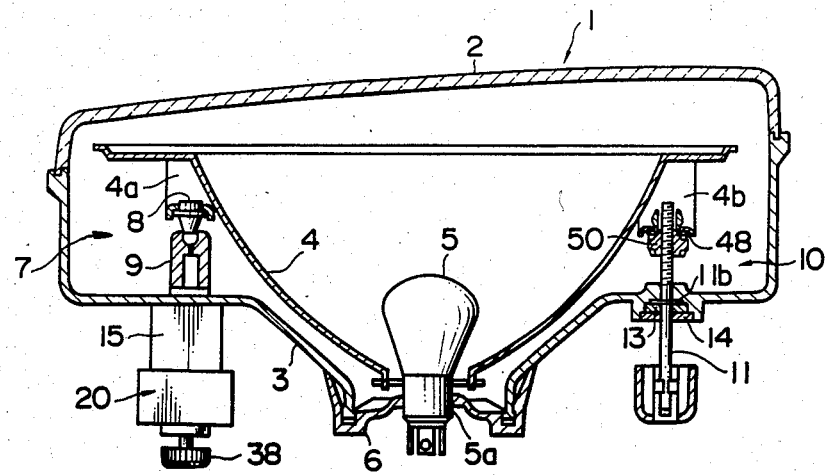
FIG. 2 is a sectional view taken along a line I—I in FIG. 1.
Figure 3:
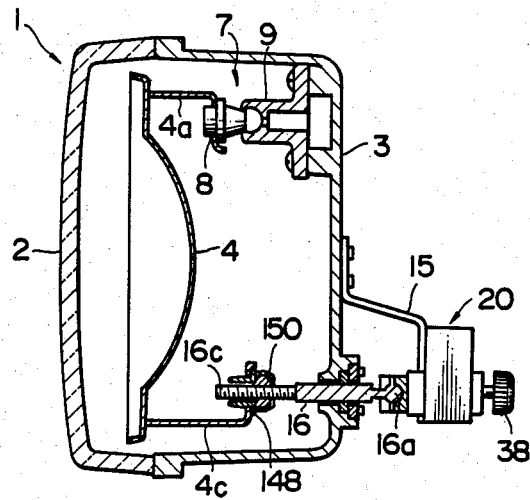
FIG. 3 is a sectional view taken along a line II—II in FIG. 1.

FIG. 1 shows a headlamp for motor vehicles to which a first example of a device for adjusting the inclination of the light axis of headlamps according to the present invention is attached. In FIG. 1, reference numeral 1 represents a headlamp of the so-called reflector movable type, which comprises a lens 2 arranged at the front of a lamp housing 3, and a reflector 4 supported by the lamp housing 3, as shown in FIGS. 2 and 3. Numeral 5 denotes a bulb attached to the reflector 4, and 6 a rubber cover fitted onto the backside opening of the lamp housing 3. A base 5a of the bulb 5 is closely fitted into the water- and dust-proof rubber cover 6 and projected outside the lamp housing 3.

The reflector 4 is supported swingable by the lamp housing 3 at three points, one of which is a fulcrum mechanism 7. The other of the remaining two points is an aiming means 10, and the last is a light axis adjusting device 20 provided with aiming and levelling mechanisms and attached to the lamp housing 3 via a bracket 15. As shown in FIG. 2, the fulcrum mechanism 7 is a ball joint comprising snap-engaging a pivot rod 8 fixed to an attachment piece 4a at the backside of the reflector 4 with a pivot holder 9 attached to the lamp housing 3. As shown in detail in FIGS. 9 and 10, the aiming means 10 includes a rotatable adjusting screw 11 which passes through the lamp housing 3 and which is limited in its movement toward its axial direction, a screw mounting 48 made of synthetic resin and having a pair of elastic engagement pieces 46 and 46 at the foremost end thereof and a through-hole 47 formed therein, and a ball joint 50 fitted into the through-hole 47 of the screw mounting 48 and having a through-hole 49 provided with a screw-thread into which a screw-threaded portion 11A of the adjusting screw 11 is screwed. The elastic engagement pieces 46 of the screw mounting 48 are forced into an opening 51 of an attachment piece 4b at the backside of the reflector 4, in such a way that the attachment piece 4b is engaged with grooves formed at the base 46A of the engagement pieces 46, thereby holding the screw mounting 48 non-rotatable relative to the attachment piece 4b thanks to the elasticity of the engagement pieces 46. The ball joint 50 is fitted into the through-hole 47 of the screw mounting 48 in such a way that the ball joint 50 does not rotate around the axis of the screw mounting 48, and the screw-threaded portion 11A of the adjusting screw 11 is screwed into the through-hole 49 of the ball joint 50. The rotation of the ball joint 50 around the axis of the screw mounting 48 is prevented by engaging projections 52 and 52 on the outer circumference of the ball joint 50 with slits 53 of the screw mounting 48.

Since the screw mounting 48 engaged with the attachment piece 4b of the reflector 4 can be thus moved in the universal manner in relation to the ball joint 50, into which the adjusting screw 11 is screwed, at the connected portion between the aiming means 10 and the reflector 4, the reflector 4 can be swung in left and right directions in FIG. 1 and also be swung to smoothly achieve an arc movement which is perpendicular to the arc movement attained when the reflector 4 is swung in left and right directions in FIG. 1.

In FIG. 9, reference numeral 11B represents a collar of the adjusting screw 11, which can be held rotatable at its predetermined position by attaching the collar 11B, a water-proof seal packing 13 and a holder 14 to the lamp housing 3 in this order.

As apparent from the example of light axis adjusting device 20 shown in FIGS. 4 through 8, it comprises a motor 23, a hollow gear 27 rotatable at its predetermined position through a speed reducing mechanism 24 which reduces the rotation speed of the motor 23, a sleeve 28 screwed into the hollow gear 27 and movable linearly in relation to the hollow gear 27, a drive shaft member 29 fitted into the sleeve 28 to adjust the light axis of the headlamp 1, using the linear movement of the sleeve 28, and a continuous variable resistor 34 made operative by the rotation of the hollow gear 27, wherein the rotation of the motor 23 can be stopped at a predetermined position by detecting a difference in voltage, using the continuous variable resistor 34.

Figure 5:
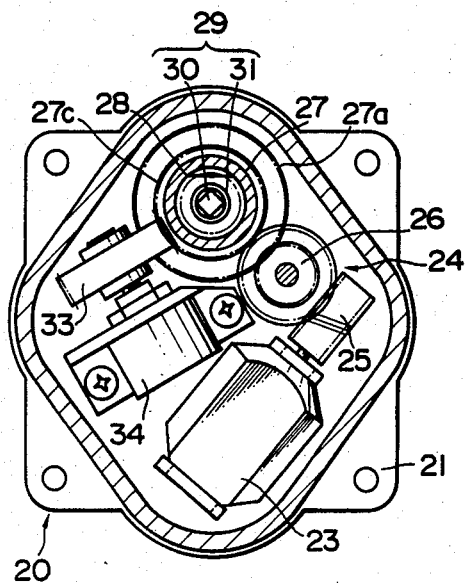
FIG. 5 is a sectional view taken along a line III—III in FIG. 4.
Figure 6:
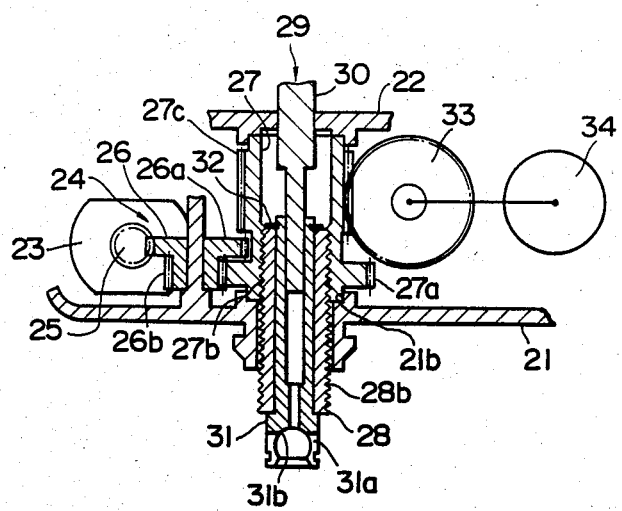
FIG. 6 is a sectional view showing the main portion in FIG. 5.
Figure 7:
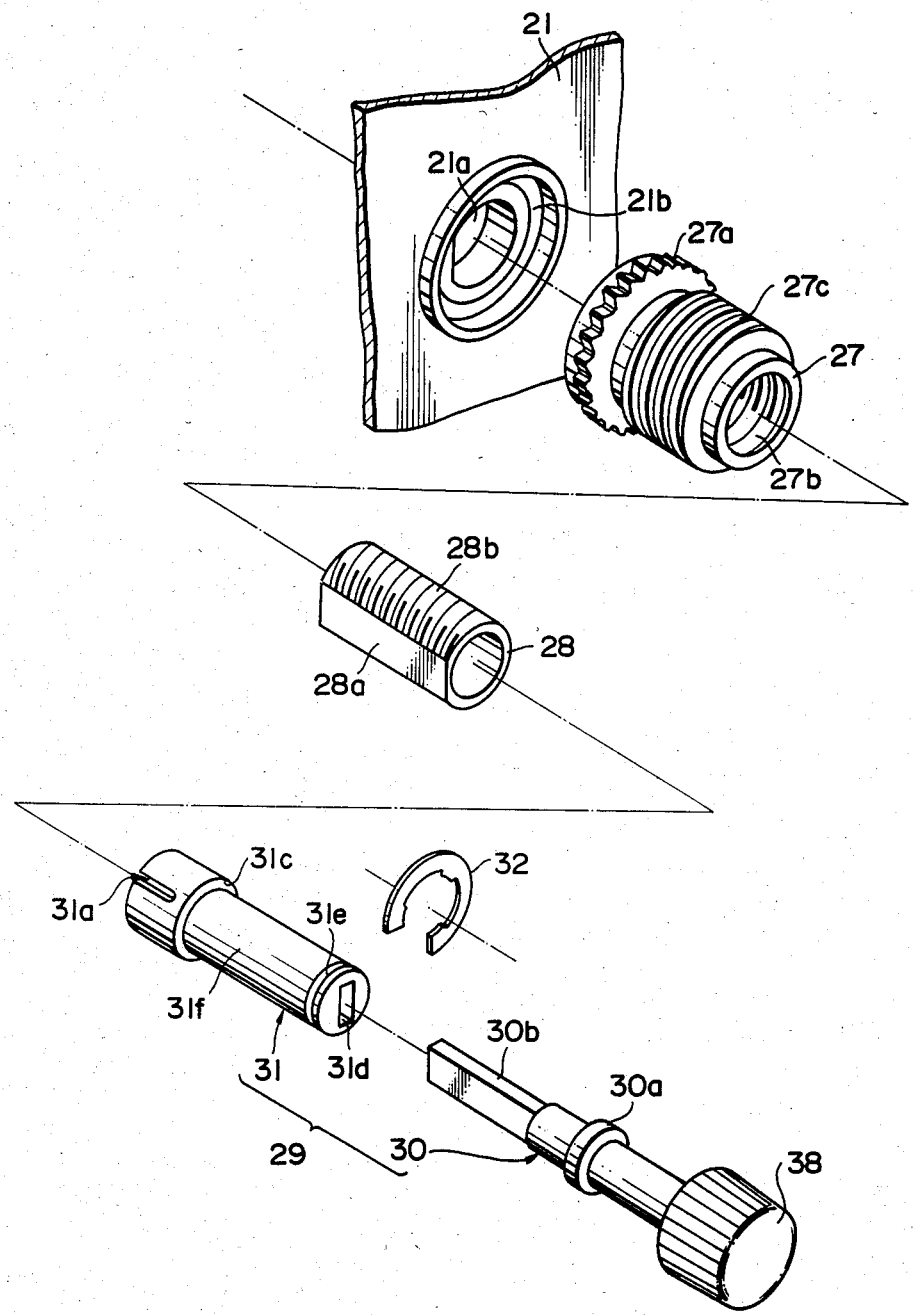
FIG. 7 is a perspective view showing the main portion in FIG. 6 enlarged and dismantled.

More specifically, the motor 23 is arranged in a chamber formed by two casings 21 and 22. As shown in FIGS. 5 and 6, the speed reduction mechanism 24 includes a worm gear 25 attached to the rotating shaft of the motor 23, and a wheel gear 26 engaged with the worm gear 25. The wheel gear 26 has a first gear portion 26a engaged with the worm gear 25 and a second gear portion 26b, smaller in diameter than the first gear portion 26a. The wheel gear 26 is supported rotatable by the casing 21. As shown in FIG. 7, the hollow gear 27 has a first flange-like gear portion 27a formed thereon adjacent to one end thereof and engageable with the second gear portion 26b of the wheel gear 26, a screw thread 27b formed on the inner circumference thereof, and a second gear portion 27c formed on the outer circumference thereof and smaller in diameter than the first gear portion 27a. One end of the hollow gear 27 is fitted into a recess 21b formed around a through-hole 21a in the casing 21, while the other end thereof is contacted with the casing 22, so that the hollow gear 27 can be supported rotatable at a predetermined position between the casings 21 and 22.

The sleeve 28 is formed non-circular in section, as shown in FIG. 7. A flat surface 28a is formed on the outer circumference and along the longitudinal axis of the sleeve 28 to make its section non-circular like D-shape. Formed on the remaining outer circumference of the sleeve 28 is a screw thread 28b engageable with the screw thread 27b of the hollow gear 27. The sleeve 28 thus arranged is supported non-rotatable by screwing it into the hollow gear 27 while fitting its remaining end into the through-hole 21a of the casing 21. More specifically, the through-hole 21a of the casing 21 is formed to have a non-circular D-like section which corresponds to the external form of the sleeve 28. When the sleeve 28 is fitted into the through-hole 21a, therefore, it is held non-rotatable even if the hollow gear 27 is rotated, but since it is screwed into the hollow gear 27, it is linearly moved by the rotation of the hollow gear 27, keeping it non-rotatable.

The drive shaft member 29 fitted into the sleeve 28 to adjust the light axis of the headlamp 1 responsive to the linear movement of the sleeve 28 includes a shaft portion 30 and an adjusting rod 31, as shown in FIG. 7. The shaft portion 30 has a collar 30a formed at the central portion thereof, and an insertion 30b formed, rectangular in section, for example, on one side thereof. The adjusting rod 31 has a spherical socket portion 31b formed at one end thereof and provided with a slit 31a, and a step 31c formed on the outer circumference and adjacent to the one end thereof. In addition, the adjusting rod 31 has a rectangular hole 31d which is formed at the other end thereof and which corresponds to the external form of the insertion 30b of the shaft portion 30, and a groove 31e formed on the outer circumference and adjacent to the other end thereof. A smaller-diameter portion 31f of the adjusting rod 31 is inserted into the sleeve 28 till its step 31c strikes on one end face of the sleeve 28, and an E-ring 32 is then fitted into the groove 31e on its foremost end projected from the sleeve 28, which is thus prevented from moving in its thrusting direction but held freely rotatable. The insertion 30b and the hole 31d may be formed non-circular elliptic in section, and may also be formed reversely, the insertion formed on the adjusting rod while the hole formed in the shaft portion.

Figure 4:
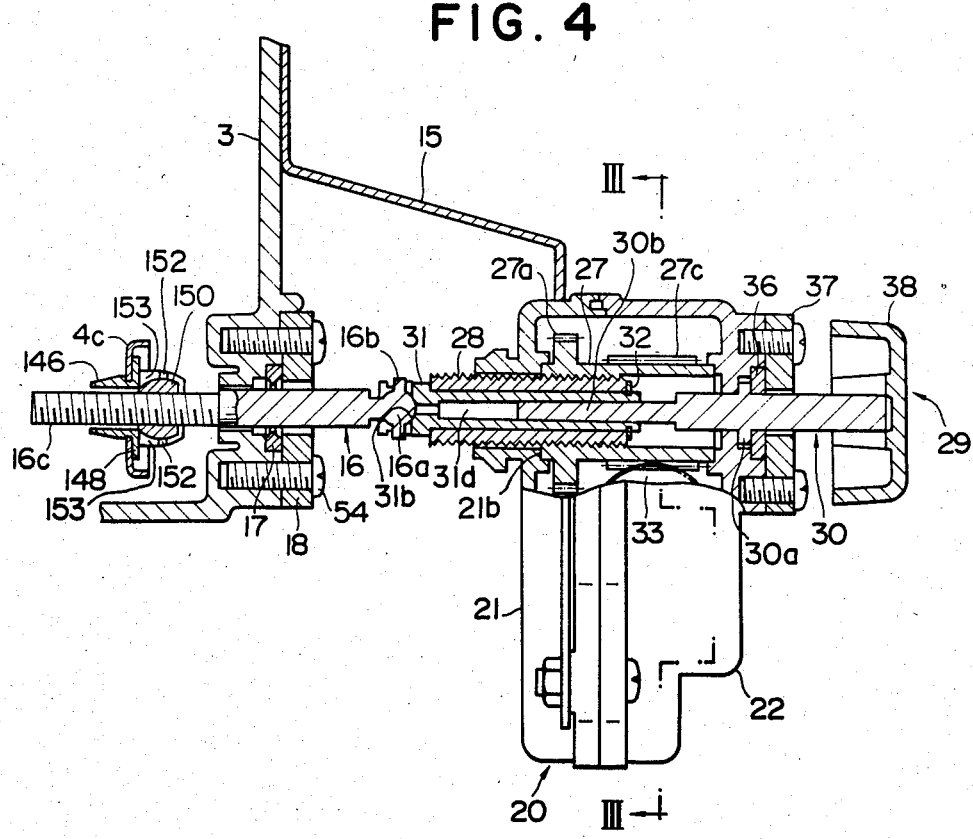
FIG. 4 is an enlarged view showing a part in FIG. 3 partly sectioned.

As shown in FIG. 4, the insertion 30b of the shaft portion 30 is inserted into the hole 31d of the adjusting rod 31 to thereby form the drive shaft member 29, and the shaft portion 30 is supported, rotatable at a predetermined position, by the holder 37 through the waterproof packing 36, said holder 37 being fixed to the casing 22 by means of screws. A ball portion 16a formed at one end of a connector rod 16 which passes through the lamp housing 3 and which is allowed to rotate there is fitted into the spherical socket portion 31b of the adjusting rod 31, with its projections 16b received in the slit 31a of the spherical socket portion 31b.

Figure 11:
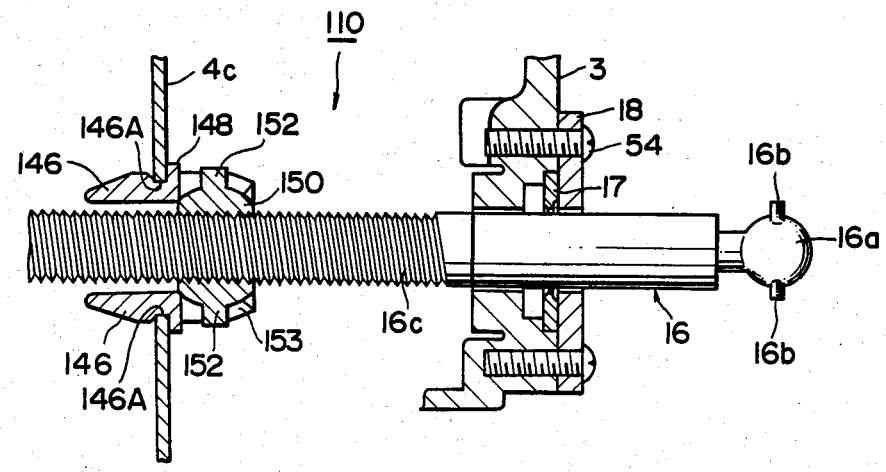
FIG. 11 is a sectional view showing the main portion in FIG. 6 enlarged.
Figure 12:
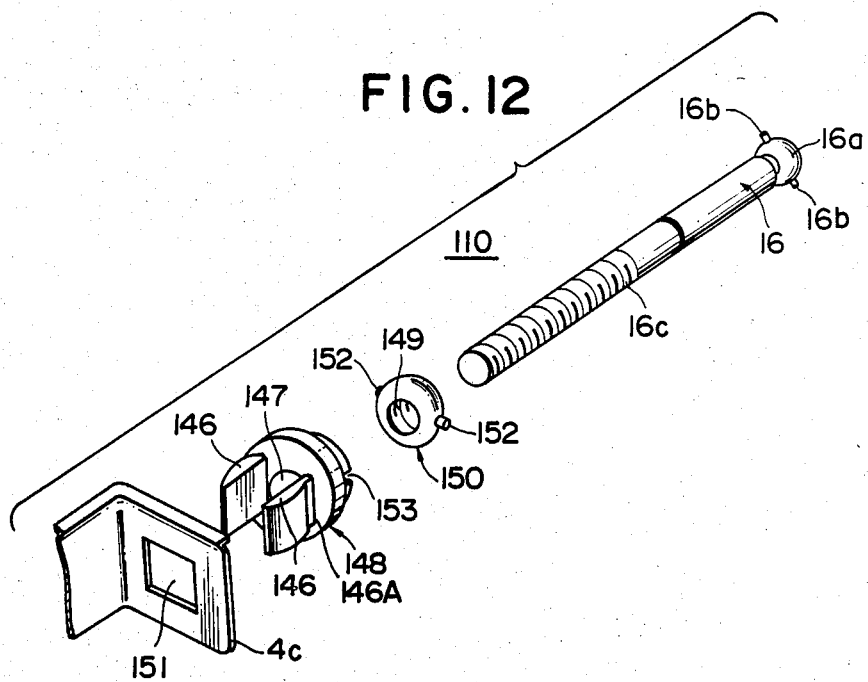
FIG. 12 is a perspective view showing the main portion in FIG. 11 disassembled.

As shown in FIGS. 11 and 12, the connector rod 16 has a screw-thread portion 16c, opposite to its ball portion 16a, and the screw-thread portion 16c of the connector rod 16 is screwed into a through-hole 149 of a ball joint 150, which is formed spherical and provided with projections 152 and 152 which are shifted by about 180° from each other on the ball joint 150. The ball joint 150 is held freely swingable by a connector rod holding mounting 148 fixed to the attachment piece 4c on the backside of the reflector 4. More specifically, the mounting 148 is made of synthetic resin, and has a pair of elastic engagement pieces 146 and 146 on its foremost end. The mounting 148 also has a through-hole 147 which is made spherical, corresponding to the external form of the ball joint 150, and slits 153 and 153 into which the projections 152 and 152 of the ball joint 150 are fitted. When the ball joint 150 is fitted into the through-hole 147 with its projections 152 and 152 received in the slits 153 and 153, it is held freely swingable but not rotatable by the mounting 148. The elastic engagement pieces 146 and 146 of the mounting 148 are forced into an opening 151 of the attachment piece 4c to engage the piece 4c with a groove 146A which is provided at the base of each of the engagement pieces 146, so that the mounting 148 can be engaged, non-rotatable, with the attachment piece 4c due to the elasticity of the engagement pieces 146.

The mounting 148, ball joint 150 and connector rod 16 serve to form a light axis changing mechanism 110. In FIG. 4, reference numeral 17 denotes a waterproof seal packing, 18 a holder for attaching the seal packing 17 to the lamp housing 3, 38 a knob arranged on the other end of the shaft 30, and 54 screws for attaching the holder 18 to the lamp housing 3.

According to the above-described embodiment, aiming adjustment which is to be done at the time of attaching the headlamps 1 to the car body can be achieved: the shaft 30 is hand-operated; the adjusting rod 31 is rotated in the sleeve 28 but together with the shaft 30; the connector rod 16 connected to the adjusting rod 31 is also rotated; the ball joint 150 into which the connector rod 16 is screwed is thus moved linearly together with the mounting 148 and the reflector 4 is thus swung to determine an initial direction of the light axis.

Levelling adjustment which serves to correspond to any directional change of the light axis caused depending upon the carrying conditions can be achieved by rotating the hollow gear 27 by means of the motor 23 and the speed reduction mechanism 24. When the hollow gear 27 is rotated, the sleeve 28 is linearly moved but not rotated while the adjusting rod 31 is also linearly moved together with the sleeve 28, sliding on the insertion 30b of the shaft 30. The connector rod 16 connected to the adjusting rod 31 is thus linearly moved to swing the reflector 4, thereby enabling the light axis to return to its original position aimed.

As described above, the continuous variable resistor 34 for controlling and stopping the rotation of the motor 23 is of rotary volume in this embodiment, and this resistor 34 is attached to the casing 21, as shown in FIG. 5. Fixed to the shaft of the resistor 34 is a worm wheel 33, which is engaged with the second gear portion 27c of the hollow gear 27 to reduce the rotation speed of the resistor 34.

Figure 8:
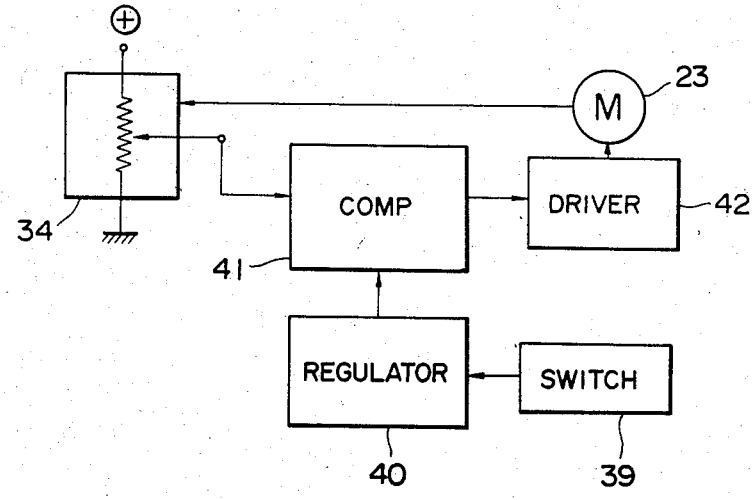
FIG. 8 is a block diagram showing a control system which can be applied to the light axis adjusting device of the present invention.

FIG. 8 is a control block diagram, in which numeral 39 represents a switch, 40 a reference voltage regulator, 41 a voltage comparison circuit and 42 a driver circuit. In order to adjust the light axis of the headlamp 1 which is arranged as shown in FIG. 5, the levelling adjustment is carried out as follows: the switch 39 accessible from the driver's seat is operated to determine a voltage which corresponds to a light axis adjusting angle needed to return the headlamp 1 to its original position; this voltage is compared with the voltage of the continuous variable resistor 34 by means of the voltage comparison circuit 41; when they are different from each other, the motor 23 is rotated by the driver circuit 42; the hollow gear 27 is thus rotated to make the continuous variable resistor 34 operative, and the motor 23 is stopped at that position of the continuous variable resistor 34 whose voltage becomes equal to the predetermined voltage; the adjusting rod 31 of the driver shaft member 29 is linearly moved together with the sleeve 28 because the latter is driven by the rotation of the hollow gear 27; and the reflector 4 is swung and return to its original position, responding to the above-described linear movement of the connector rod 16, thereby enabling the light axis of the headlamp 1 to be directed in its optimum direction.

The light axis adjusting device 20 according to the above-described embodiment of the present invention uses the single continuous variable resistor 34 to achieve detection function, thereby enabling the device 20 itself to be made small-sized. In addition, the continuous variable resistor 34 can change voltage continuously, it is easy to determine that position of the resistor 34 where the voltage of the resistor 34 becomes equal to the predetermined voltage, thereby enabling the positional accuracy of the stopped resistor 34 to be remarkably enhanced. The strength of suspension becomes different even under same carrying conditions, depending upon the kinds of motor vehicles, and the amount of light axis adjustment must be therefore changed to correspond to this change. According to the light axis adjusting device 20, however, this change can be covered only by changing the predetermined voltage in the car. This teaches us that the light axis adjusting device 20 can be applied to any kind of motor vehicles. Further, the light axis adjusting device 20 also has the aiming function, thereby making it easy to attach the device 20 to the car body or headlamps.

Figure 13:
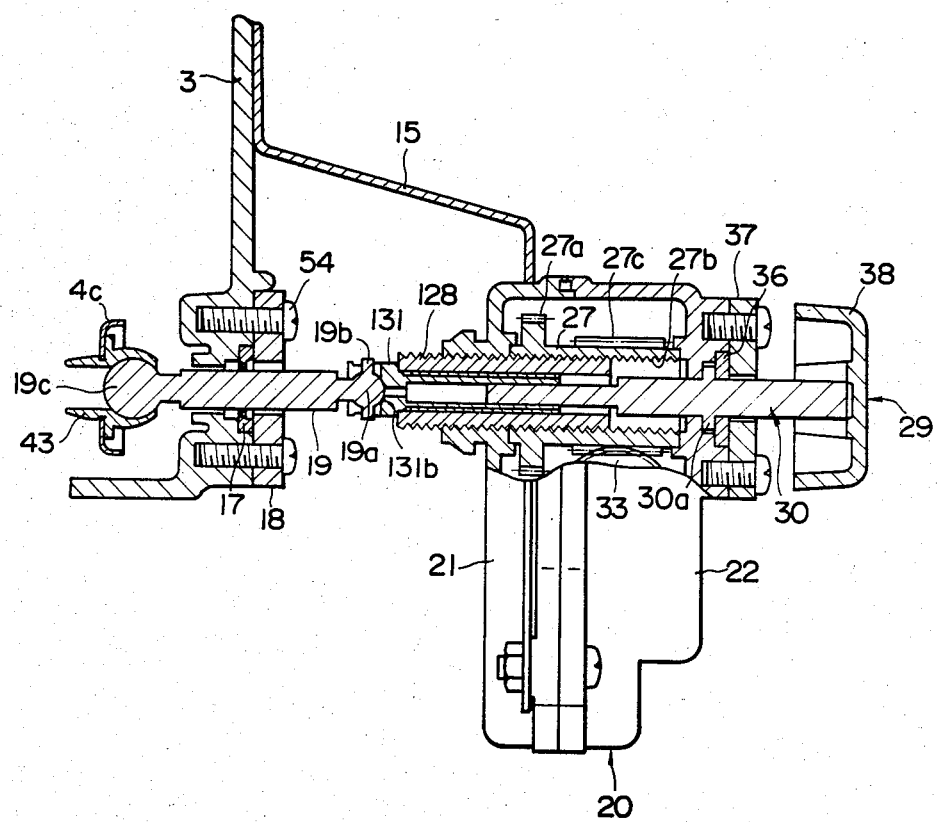
FIG. 13 is a sectional view showing a second example of a device for adjusting the inclination of the light axis of headlamps according to the present invention.
Figure 14:
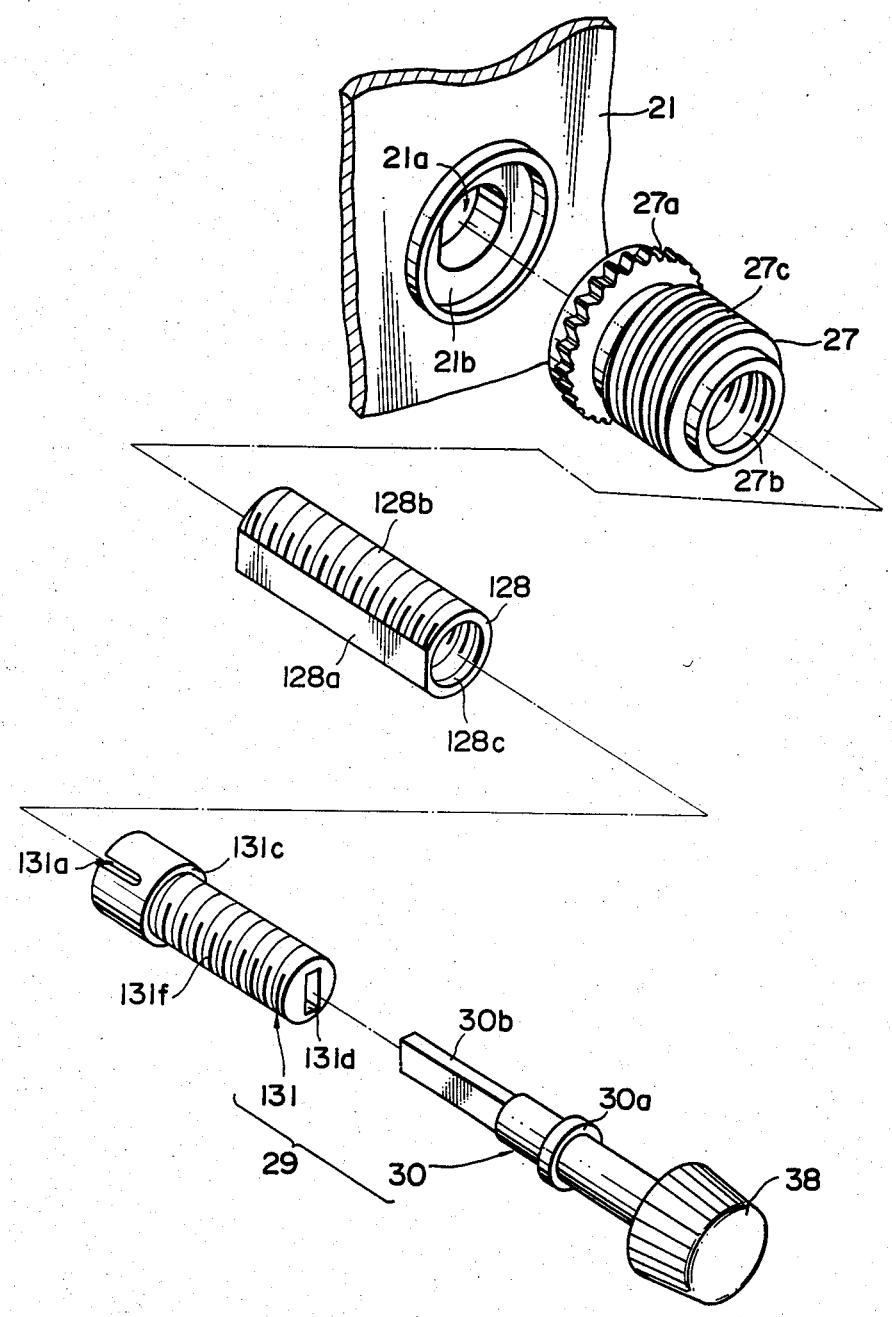
FIG. 14 is a perspective view showing the main portion in FIG. 13 enlarged and disassembled.

FIGS. 13 and 14 show a second example of light axis adjusting device according to the present invention. Parts same as those in the first embodiment will be denoted by same reference numerals and description on these parts will be omitted.

As shown in FIG. 14, an adjusting rod 131 of the driver shaft member 29 has a spherical socket portion 131b (see FIG. 13) formed at one end thereof and provided with a slit 131a, a step 131c formed on the outer circumference adjacent to the one end thereof, and a screw thread 131f formed extending from the step 131c to the other end thereof. A sleeve 128 which is formed non-circular because of that surface 128a formed on its outer circumference has an inner screw thread 128c engageable with the screw thread 131f of the adjusting rod 131. As shown in FIG. 13, the adjusting rod 131 of the driver shaft member 29 is screwed into the sleeve 128 and a ball portion 19a of a connector rod 19 is pivot-fitted into the spherical socket portion 131b. Projections 19b of the ball portion 19a is received into the slits 131a and 131a a second ball joint 19c formed on the other end of the connector rod 19 is snapped into a rod mounting 43 arranged in the attachment piece 4c of the reflector 4.

When the aiming adjustment is to be intended, the shaft 30 of the driver shaft member 29 arranged at the casing 22 is rotated at a certain position to rotate but linearly move only the adjusting rod 131 because the sleeve 128 is locked by the casing 21, so that the connector rod 19 can be thus rotated but linearly moved to swing the reflector 4 so as to adjust the light axis of the headlamp 1.

In the case of the levelling adjustment intended, the sleeve 128 is rotated but linearly moved by the hollow gear 27 rotated by the motor 23, so that the adjusting rod 131 engaged with the sleeve 128 can be thus linearly moved to swing the reflector 4 through the connector rod 19 so as to return the light axis of the reflector to its predetermined position.

Figure 15:
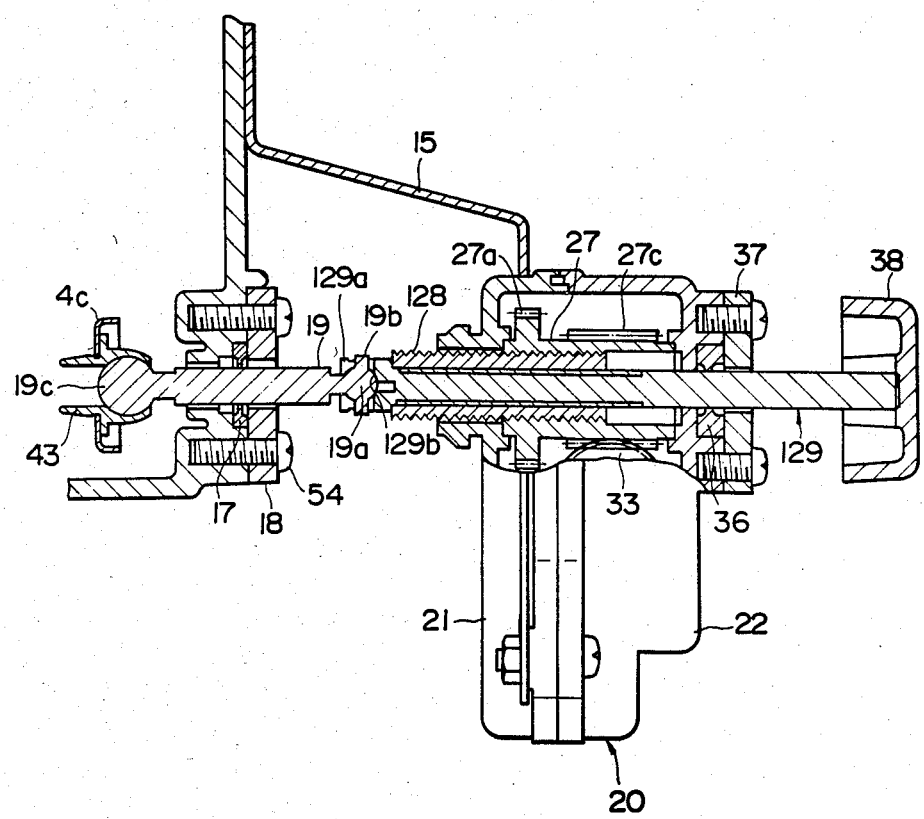
FIG. 15 is a sectional view showing a third example of a device for adjusting the inclination of the light axis of headlamps according to the present invention.
Figure 16:
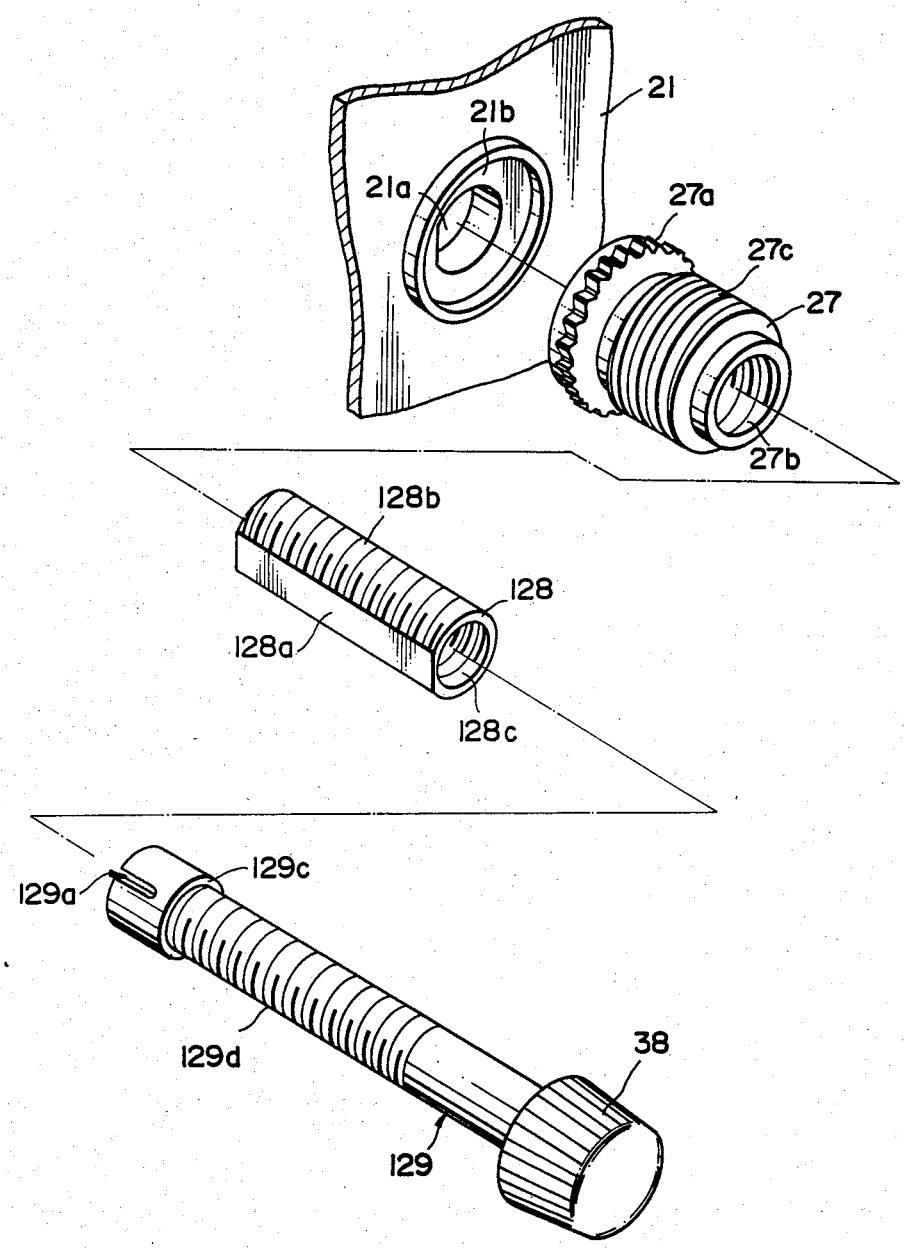
FIG. 16 is a perspective view showing the main portion in FIG. 15 enlarged and dismantled.

FIGS. 15 and 16 are sectional and perspective views, respectively, showing a third embodiment of the present invention. Also in this case, parts same as those in the above-described embodiments will be represented by same reference numerals and description on these parts will be omitted.

In contrast to the first and second embodiments wherein the shaft portion is a parts different from the adjusting rod, a driver shaft member 129 is a parts comprising the shaft portion and the driver portion, as shown in FIG. 16. The driver shaft member 129 has a spherical socket portion 129b (see FIG. 15) formed at one end thereof and provided with a slit 129a, a step 129c formed adjacent to the one end thereof, and a screw thread 129d formed extending from the step 129c toward the other end thereof. As shown in FIG. 15, the screw thread 129d of the driver shaft member 129 is screwed into the internal screw thread 128c of the sleeve 128 and the ball joint 19a of the connector rod 19 is pivot-fitted into the spherical socket portion 129b of the driver shaft member 129 which passes through the casings 21 and 22.

When the aiming adjustment is to be intended, therefore, the driver shaft member 129 is rotated but linearly moved because the sleeve 128 is locked by the casing 21, so that the linear movement of the driver shaft member 129 itself can swing the reflector 4 through the connector rod 19 to adjust the light axis.

When the levelling adjustment is to be intended, the sleeve 128 is linearly moved, without rotating, by the hollow gear 27 rotated by the motor 23, so that the driver shaft member 129 screwed into the sleeve 128 can also be linearly moved to return the light axis to its predetermined position.

Figure 17:
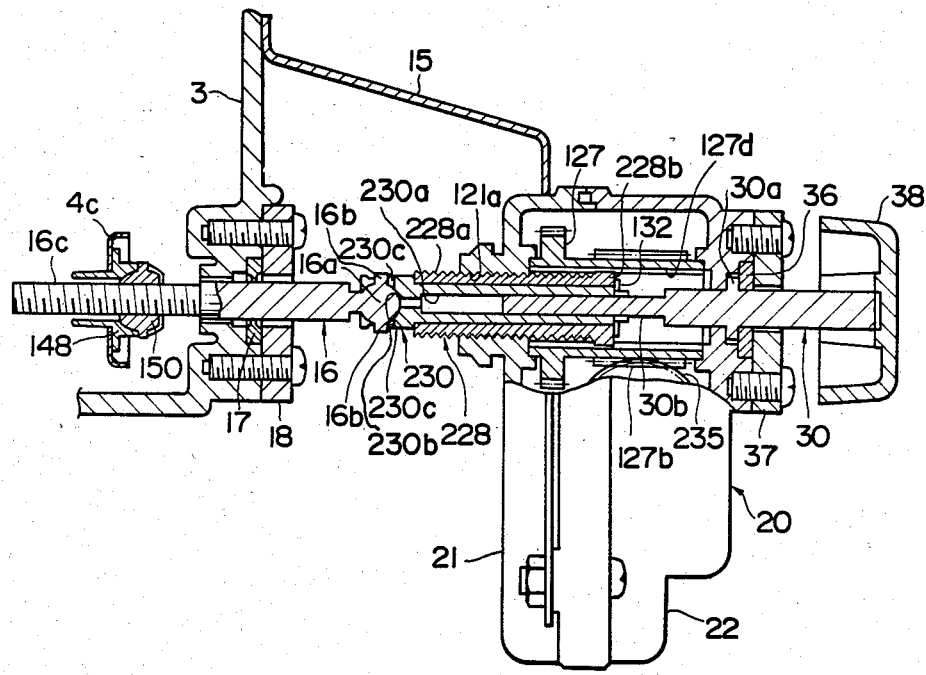
FIG. 17 is a sectional view showing a fourth example of a device for adjusting the inclination of the light axis of headlamps according to the present invention.
Figure 18:
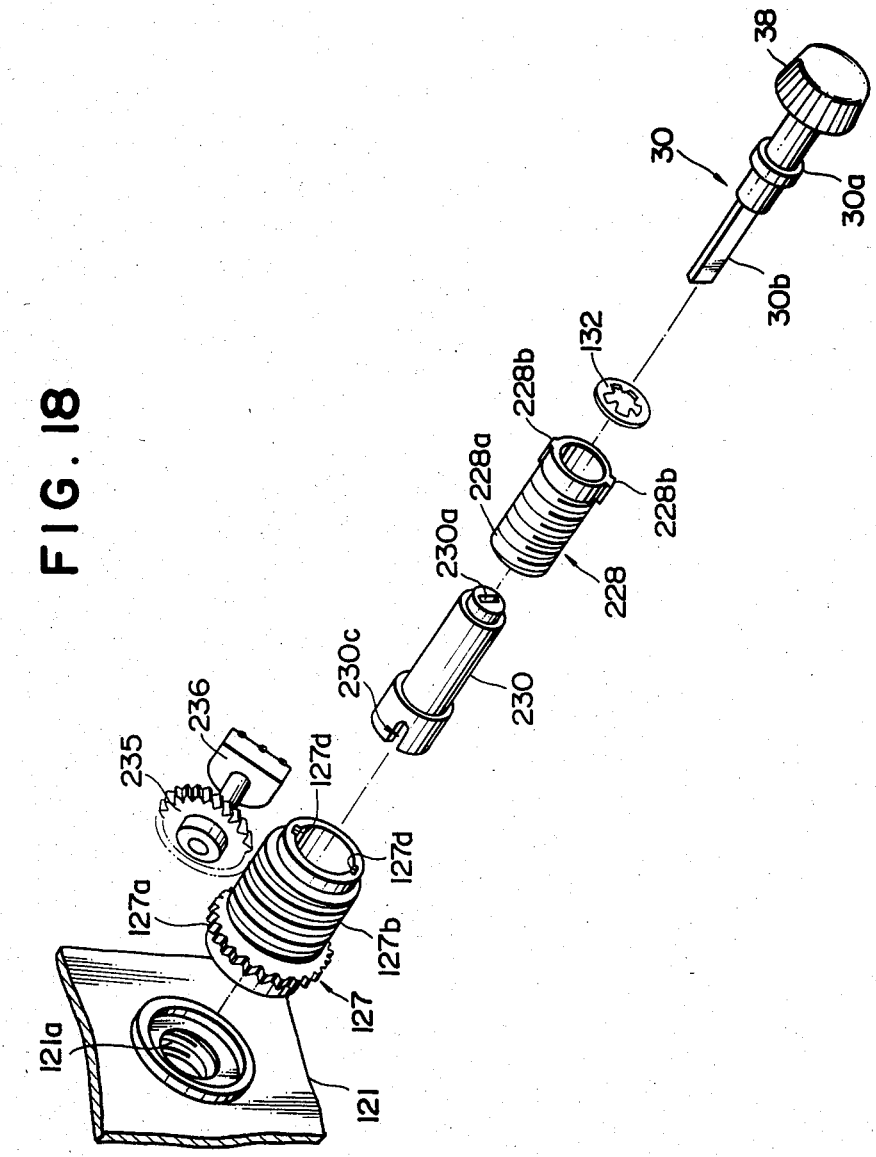
FIG. 18 is a perspective view showing the main portion in FIG. 17 enlarged and disassembled.

FIGS. 17 and 18 are sectional and perspective views, respectively, showing a fourth embodiment of the present invention. Parts same as those in the above-described embodiments will be denoted by same reference numerals and description on these parts will be omitted.

Engaging projections 228b and 228b are formed on the back end (when viewed from the direction of the headlamp or right side in FIGS. 17 and 18) of a sleeve 228 and freely slidably fitted into grooves 127d and 127d formed on the inner circumference of a hollow gear 127 and extended in the axial direction thereof. As the result, the hollow gear 127 and the sleeve 228 can slide freely relative to each other in the axial direction but be prevented from rotating around the axis. It may be arranged in this case that the projections are formed on the hollow gear 127 while the grooves in the sleeve 228.

An adjusting rod 230 is inserted into the sleeve 228 to freely rotate relative to the latter but prevented from sliding in the axial direction of these members by means of a clip 132.

The hand-operating shaft 30 is passed through the casing 22 which is opposite to the casing 121 through which the sleeve 228 is screwed and passed, and the collar 30a on the shaft 30 is pressed by the shaft holder 37 through the seal packing 36, so that the shaft 30 can be restricted a little in rotation at its predetermined position and also in movement toward its axial direction.

FIG. 17 is a perspective view showing the female screw hole 121a, hollow gear 127, adjusting rod 230, sleeve 228, clip 131 and shaft 30 dismantled.

The front end of the shaft 30 which has the knob 38 fixed to the back end thereof is fitted into the adjusting rod 230 in such a way that the former can freely slide in the axial direction relative to the adjusting rod 230 in an insertion hole 230a thereof but be prevented from rotating around the axis of these members. In the case of the fourth embodiment, the insertion 30b which has a non-circular rectangular section is formed on the front side of the shaft 30 and inserted into an opening 130a in the back end face of the adjusting rod 230 so as to enable both of these members to be freely slid relative to each other.

When the knob 38 is hand-operated, therefore, the adjusting rod 230 is freely rotated relative to the sleeve 228. This operation is used to achieve the aiming.

When the sleeve 228 is rotated, it is moved, rotating, front- or backward in its axial direction due to the engagement between the male and female screws 228a and 121a, so that the adjusting rod 230 inserted into it can be moved front- or backward without rotating because the rod 230 is left free from its rotation but engaged with the shaft 30 to which slight friction force is applied. This operation is used to achieve the levelling.

As shown in FIG. 17, an spherical socket portion 230b is formed on the front end face of the adjusting rod 230, and the ball portion 16a formed on the back end face of the connector rod 16 is fitted into the spherical socket portion 230b of adjusting rod 230, with its projections 16b and 16b received in slits 230c and 230c of the rod 230, so that relative rotation between these rods 230 and 16 can be prevented around the axis thereof. The screw thread 16c of the connector rod 16 is engaged with the screw thread on the inner circumference of the through-hole of the ball joint 150, passing through the lamp housing 3. Numeral 17 denotes the water-proof packing, and 18 the holder for attaching the packing 17 to the lamp housing 3.

According to the fourth embodiment, the aiming adjustment which is to be done at the time of attaching the headlamps 1 to the car body can be attained as follows: the shaft 30 is rotated by hand; because the adjusting rod 230 is left free from the sleeve 228, it is rotated integral with the shaft 30; the connector rod 16 is thus rotated at its predetermined position; the ball joint 150 which is engaged with the screw portion 16c of the rod 16 is screw-advanced by the connector rod 16; and the mounting 148 follows this advance of the ball joint 150 to swing the reflector 4 around the axis which passes through the fulcrum mechanism and the aiming means 10 (see FIG. 1), thereby enabling the direction of initial light axis to be adjusted.

The levelling adjustment for adjusting the direction of light axis which changes depending upon the carrying conditions can be achieved as follows: the hollow gear 127 is rotated by means of the motor 23 and the speed reduction mechanism 24, as shown in FIG. 6; the sleeve 228 is thus rotated and moved front-or backward due to the action of the male screw 228a; the linear movement of the sleeve 228 is transmitted to the connector rod 16 through the adjusting rod 230; and the reflector 4 is swung by the front- or backward movement of the connector rod 16 to return the direction of light axis to its original position.

In the case of the fourth embodiment, a worm gear 127b is formed on the outer circumference of the cylindrical hollow gear 127 and a worm wheel 235 which is engaged with the worm gear 127b is fixed to the axis of a potentiometer 236, as shown in FIG. 18. Therefore, the rotation of the hollow gear 127 can be picked up as an electric signal by the potentiometer 236. Since the rotation angle of the hollow gear 127 is proportional to the advancing and retreating distance of the adjusting and connector rods 230 and 16, the direction of light axis can be detected using the electric signal. Therefore, the electric signal can be used to display and automatically control the direction of light axis.

As apparent from the construction of the electric signal pickup means shown in FIG. 18, the center axis of the worm wheel 235 is made perpendicular to that of the hollow gear 127. Accordingly, any error which acts on the potentiometer 236 can be neglected even when the support of the hollow gear 127 is made with some looseness in the radial direction thereof.

Although the present invention has been described referring to the headlamp of the reflector movable type, the light axis adjusting device of the present invention can be applied to the headlamp in which a pre-focus light unit of lens and reflector is incorporated.

Although the present invention has been described in preferred forms with a certain degree of particularity, it should be understood that the present disclosure of the preferred embodiments is made by way of example and that various modifications may be resorted to without departing from the true spirit and scope of the present invention. It is intended that the patent shall cover, by suitable expression in the appended claims, whatever features of patentable novelty exist in the invention disclosed.

What is claimed is:

1. In a device for adjusting the inclination of a light axis of a headlamp by controlling a light axis changing mechanism which changes the light axis of a headlamp in relation to a car body, said light axis changing mechanism comprising:

a mounting means arranged on a side of the headlamp;
    a ball joint for cooperating with the mounting means to achieve a ball socket joint; and
    a connector rod means one end of which is connected to the ball joint;
    and said light axis adjusting device comprising:
    a casing;
    a motor arranged in the casing;
    a hollow gear means arranged to be rotatable in the casing;
    a speed reduction mechanism arranged in the casing and connected to the motor and the hollow gear means to reduce the output of the motor and transmit it to the hollow gear means;
    a sleeve inserted into the hollow gear means and moved linearly when the hollow gear means is rotated;
    a means for converting the rotation of the hollow gear means to a force which causes the sleeve to be moved linearly; and
    an adjusting rod means connected with an end of said connector rod means by a ball joint mechanism which is constructed by a spherical socket provided at the end of one of said rod means and having slit, and a ball means formed at the end of the other of said rod means and having projection engaged with said slit for coupling said spherical socket and ball means in the manner that both rod means can swing freely with respect to each other but rotate integrally;
    said adjusting rod means being reciprocated with the connector rod means, following the movement of the sleeve to adjust the inclination of the light axis of the headlamp.

2. A device for adjusting the inclination of the light axis according to claim 1 wherein the mounting means has a through-hole whose inner wall is made spherical, and slits formed along the axis of the through-hole, and the ball joint has projections on its outer spherical circumference which are received in the slits of the mounting means when the ball joint is snapped into the mounting means, and the ball joint also has a through-hole through which one of the connector rods is inserted.

3. A device for adjusting the inclination of the light axis according to claim 1 wherein:

a female screw thread is formed on the inner wall of the through-hole of the mounting means and a male screw thread is formed on the outer circumference of the connector rod which is inserted into the through-hole, so that the mounting means can be screw-advanced in relation to the connector rod means when the connector rod is rotated.

4. A device for adjusting the inclination of the light axis according to claim 1 wherein:

the mounting means has a spherical portion inside and the ball joint has a spherical external form corresponding to the spherical portion of the mounting means, so that the ball joint can be snapped into the mounting means, and the ball joint is connected integrally to one end of the connector rod.

5. A device for adjusting the inclination of the light axis according to claim 1 wherein:

a ball joint provided with projections is formed on one of the outer end of the connector rod and of the headlamp side end of the adjusting rod means, and a spherical socket portion provided with slits into which the projections of the ball joint are received is formed on the other of the other end of the connector rod and of the headlamp side end of the adjusting rod means, so that the connector rod and the adjusting rod means can be snap-connected with each other through the ball joint.

6. A device for adjusting the inclination of the light axis according to claim 1 wherein:

the headlamp includes a lamp housing provided with a lens at the front thereof, and a reflector whose angle can be changed in the lamp housing, and the connector rod is connected, via the ball joint, to the mounting means which is attached to the reflector, passing through the lower portion of the lamp housing.

* * * * *